United States Patent
Nishita

(10) Patent No.: US 6,793,412 B2
(45) Date of Patent: Sep. 21, 2004

(54) OPTICAL CONNECTOR HAVING A LIGHT EMITTING ELEMENT AND A CONVERGENT LENS

(75) Inventor: Naoki Nishita, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 25 days.

(21) Appl. No.: 10/024,655

(22) Filed: Dec. 14, 2001

(65) Prior Publication Data

US 2002/0102070 A1 Aug. 1, 2002

(30) Foreign Application Priority Data

Dec. 20, 2000 (JP) ...................................... 2000-387565
Nov. 9, 2001 (JP) ...................................... 2001-344962

(51) Int. Cl.$^7$ ............................................... G02B 6/42
(52) U.S. Cl. .......................................... 385/93; 385/88
(58) Field of Search ................................... 385/88–94

(56) References Cited

U.S. PATENT DOCUMENTS

| 5,305,408 | A |   | 4/1994 | Schaffer et al. | |
|---|---|---|---|---|---|
| 5,631,990 | A | * | 5/1997 | Hashizume | 385/92 |
| 5,724,466 | A | * | 3/1998 | Rickenbach et al. | 385/60 |
| 5,751,878 | A |   | 5/1998 | Kyoya | |
| 5,923,805 | A | * | 7/1999 | Anderson et al. | 385/86 |
| 5,949,939 | A | * | 9/1999 | Kyoya | 385/93 |
| 5,973,862 | A | * | 10/1999 | Hashizume | 359/819 |
| 6,247,851 | B1 | * | 6/2001 | Ichihara | 385/56 |
| 6,287,016 | B1 | * | 9/2001 | Weigel | 385/58 |
| 6,371,663 | B1 | * | 4/2002 | Kneier et al. | 385/88 |
| 6,450,703 | B1 | * | 9/2002 | Shirakawa | 385/92 |
| 6,459,835 | B1 | * | 10/2002 | Nagaoka et al. | 385/43 |
| 6,459,853 | B1 | * | 10/2002 | Boatman | 392/473 |
| 6,536,959 | B2 | * | 3/2003 | Kuhn et al. | 385/93 |
| 2002/0102073 | A1 | * | 8/2002 | Shirakawa | 385/92 |
| 2002/0197023 | A1 | * | 12/2002 | Serizawa | 385/88 |

FOREIGN PATENT DOCUMENTS

| EP | 0 587 914 A1 | 3/1994 |
|---|---|---|
| GB | 2 345 349 A | 7/2000 |
| JP | 11-271564 | 10/1999 |
| JP | 2000-2822 | 1/2000 |
| JP | 11-2745 | 5/2000 |
| JP | 2000-193849 | 7/2000 |
| JP | 2000-199839 | 7/2000 |

OTHER PUBLICATIONS

Johnson, et al., "Connectorized optical link package incorporating a microlens", IEEE Transactions on Components, Hybrids, and Manufacturing Technology, vol. CHMT–3, No. 4, pp. 488–492, (Dec. 1980).

European Search Report dated Sep. 22, 2003 for European Application No. 01 31 0657.

* cited by examiner

Primary Examiner—John D. Lee
Assistant Examiner—Tina M Lin
(74) Attorney, Agent, or Firm—Knobbe Martens Olson & Bear LLP

(57) ABSTRACT

The present invention provides a cheap optical connector having a simple construction without increasing bending loss and coupling loss of a multimode optical fiber fixedly inserted into e.g., an optical connector. The optical connector is constructed by fitting a receptacle connector and a plug connector. Connecting end face sides of multimode optical fibers are fixed to the plug connector. A light emitting element having a radiation numerical aperture larger than the numerical aperture of the multimode optical fiber, and a convergent lens for converging light emitted from the light emitting element so as to provide an incident numerical aperture smaller than the numerical aperture of the multimode optical fiber and making this light incident to the multimode optical fiber are arranged in the receptacle connector. A light receiving element is arranged side by side with the light emitting element, and the multimode optical fiber is optically connected to the light receiving element.

5 Claims, 7 Drawing Sheets

OPTICAL CONNECTOR HAVING A LIGHT EMITTING ELEMENT AND A CONVERGENT LENS

FIELD OF THE INVENTION

The present invention relates to an optical connector mounted and arranged in e.g., a vehicle, and used in optical communication within the vehicle.

BACKGROUND OF THE INVENTION

Intelligence technologies of a vehicle has been recently developed rapidly. For example, a vehicle position is displayed on a map by using a car navigation system. Further, management such as snarl dissolution of the vehicle is performed by utilizing an ITS (Intelligent Transport Systems). In accordance with such intelligence technologies, a processing amount of communication information such as data, images and voices within the vehicle has increased.

Therefore, the optical communication using an optical fiber as an information transmitting medium of large capacity has been performed within the vehicle such as an automobile. This optical communication is performed by making light emitted from a light emitting element incident to one end side of the optical fiber, and propagating this light in the optical fiber, and receiving this propagated light by a light receiving element arranged on the other end side of the optical fiber. An optical connector is generally used when the optical fiber is connected to an optical element such as the light emitting element and the light receiving element.

A plastic optical fiber has a large aperture and is easily treated in comparison with a glass optical fiber. Therefore, the plastic optical fiber is often applied as an optical fiber for the communication within the vehicle.

SUMMARY OF THE INVENTION

An optical connector of the present invention comprises:

a receptacle connector; and a plug connector fitted to the receptacle connector;

wherein a connecting end face side of a multimode optical fiber is fixed to the plug connector; and a light emitting element having a radiation numerical aperture larger than the numerical aperture of the multimode optical fiber, and a convergent lens for converging light emitted from the light emitting element so as to provide an incident numerical aperture smaller than the numerical aperture of the multimode optical fiber and making this light incident to the multimode optical fiber are arranged in the receptacle connector.

BRIEF DESCRIPTION OF THE DRAWINGS

Exemplary embodiments of the invention will now be described in conjunction with drawings, in which.

DETAILED DESCRIPTION

When optical communication is performed within a vehicle such as an automobile, coupling loss is caused in a connecting portion of an optical fiber (plastic optical fiber) and bending loss is caused in a bending portion of the plastic optical fiber. When these losses are large, the problem that no light can be sufficiently transmitted from a light transmitting element to a light receiving element is caused.

Therefore, for example, it is considered to reduce the coupling loss by improving the size accuracy of an optical connector. However, when the size accuracy of the optical connector is improved, its price is raised. It is required that the optical connector for an automobile is set to a cheap connector having excellent mass productivity. Therefore, the rise in price due to the improvement of the size accuracy is a problem.

It is also considered to improve the coupling loss by mutually pressing connecting end faces of the plastic optical fibers using an elastic body such as a spring. However, when the number of parts such as a spring is increased, an assembly working property of the optical connector gets worse. Further, when the spring, etc. are arranged, the elastic body such as the spring is contracted when tensile force is applied to the plastic optical fiber. Therefore, the distance between the plastic optical fibers is correspondingly widened so that the coupling loss is increased. Accordingly, it is not preferable to arrange the elastic body such as the spring.

When the automobile is assembled, a worker often connects the optical connector in groping instead of connection made by seeing a connecting end face of the optical fiber. Therefore, there is a fear that the end face of the plastic optical fiber arranged in the optical connector is damaged. Therefore, the following optical connector end face protection was proposed, but was not preferable.

Namely, for example, in Japanese Patent Laid-Open Nos. 11628/1994 and 248264/1996, it is proposed that a shutter opened and closed at a fitting time of the optical connector is arranged on an end face side of the optical fiber. However, in such a construction, the number of parts is increased, and structure becomes complicated so that it is difficult to realize a cheap optical connector.

Figure 12A:
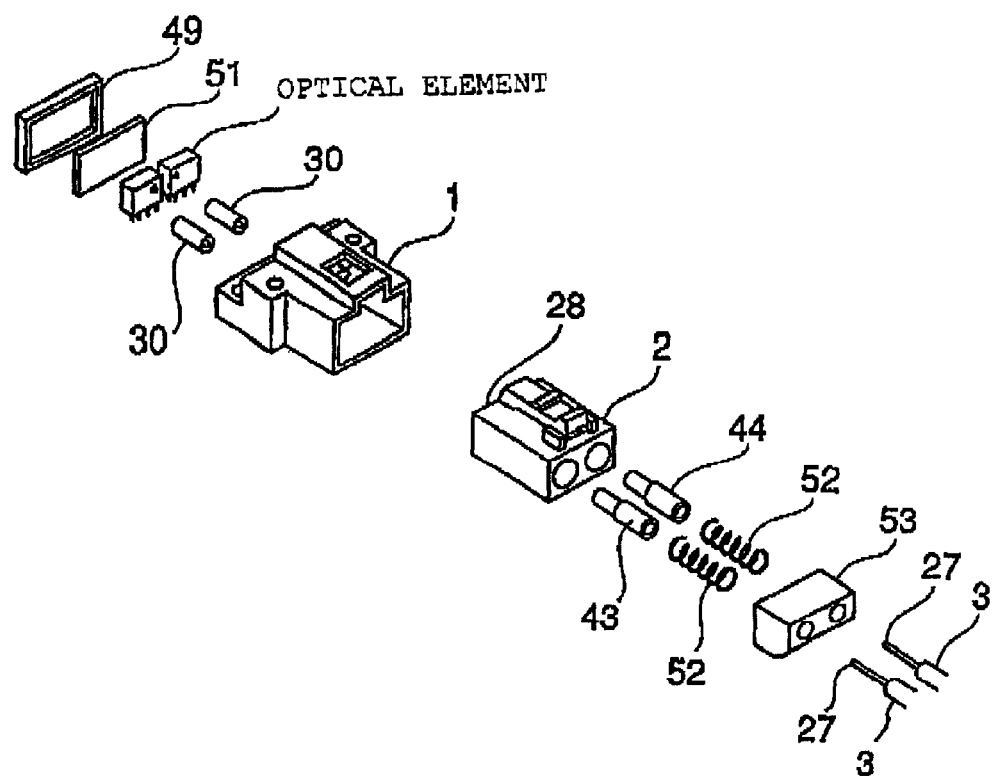
FIG. 12A is an explanatory view showing one example of an optical connector conventionally proposed in a disassembly state.
Figure 12B:
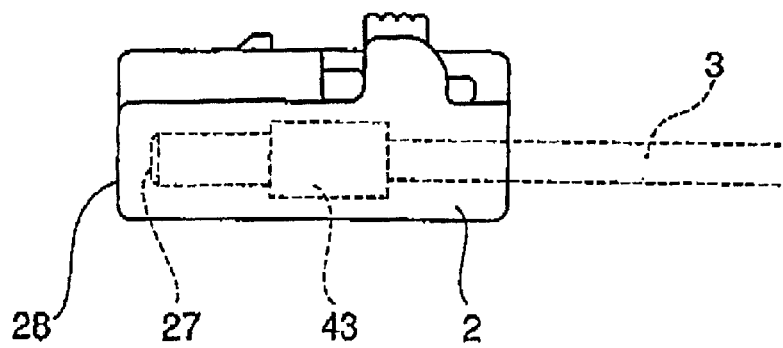
FIG. 12B is a side view showing one example of the optical connector conventionally proposed.

Further, an optical connector as shown in FIGS. 12A and 12B is proposed. This proposed optical connector is constructed such that a receptacle connector 1 for storing an optical element and a plug connector 2 for fixedly inserting a plastic optical fiber 3 are fitted to each other. In this proposed optical connector, a short optical fiber 30 shortly cut is arranged on a connecting end face side of the optical element. A connecting end face 27 of the plastic optical fiber 3 fixedly inserted into each of ferrules 43, 44 is arranged in a position deeper than a connecting end face 28 of the plug connector 2.

In FIGS. 12A and 12B, reference numerals 49, 53 designates back caps, and reference numerals 51 and 52 respectively designate an elastic body and a coil spring.

However, in the construction shown in FIGS. 12A and 12B, the number of connection portions of the short optical fiber 30 and the plastic optical fiber 3 is increased, and this increase causes an increase in coupling loss. Further, since this proposed construction uses the coil spring 52, this construction is not preferable as mentioned above.

One aspect of an optical connector of the present invention is an optical connector in which no large optical transmission loss is generated even when bending of an optical fiber fixedly inserted into the optical connector, and a position shift in connection of this optical fiber to another optical fiber are caused more or less. Further, the optical connector of the invention is simply constructed and cheaply manufactured.

Figure 1:
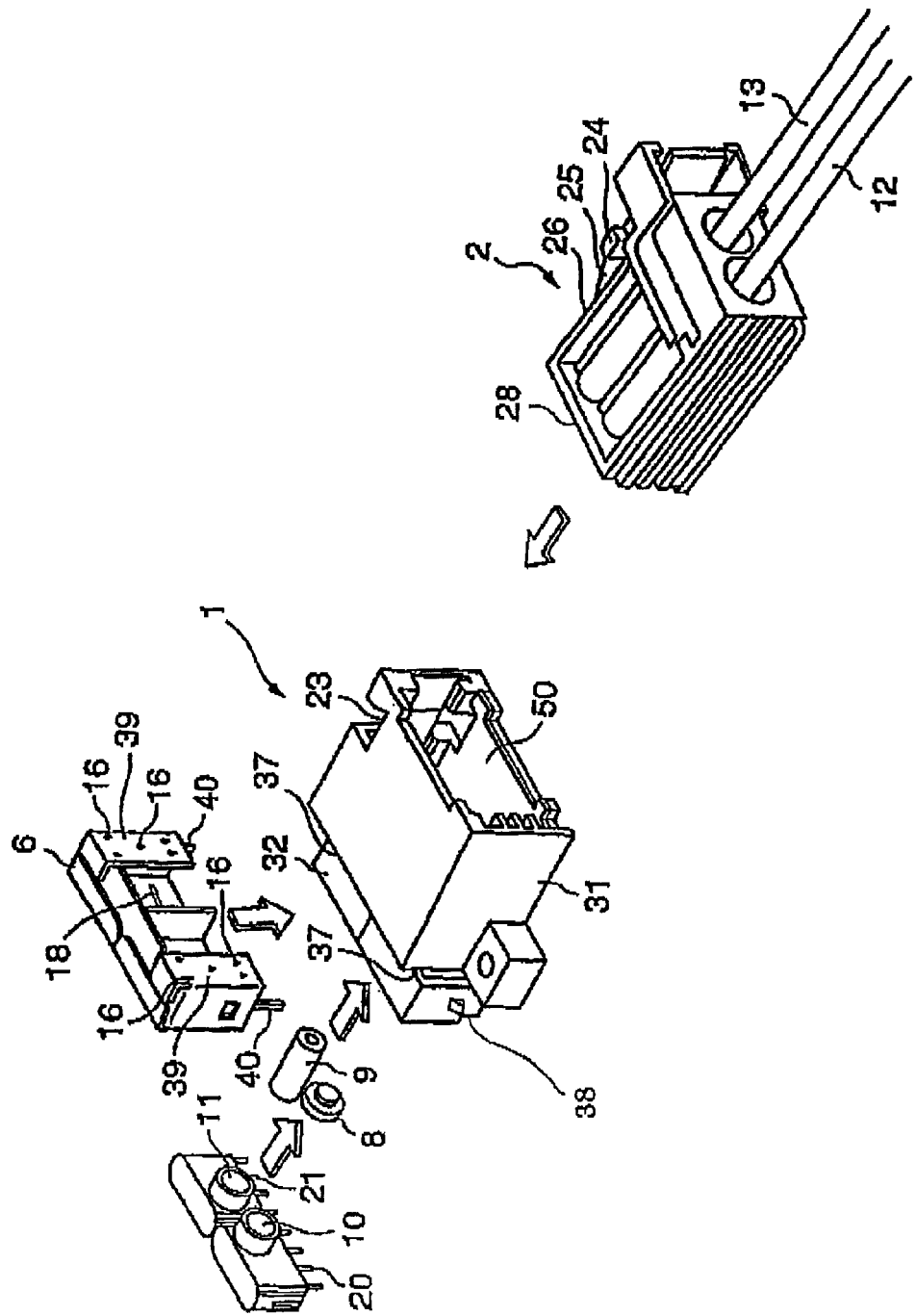
FIG. 1 is a main constructional view showing one embodiment of an optical connector in the invention in a disassembly state.

An embodiment of the invention will next be explained on the basis of the drawings. In the explanation of one embodiment, the same term portions as the example explained so far are designated by the same reference numerals, and their overlapping explanations are omitted here. FIG. 1 shows one embodiment of the optical connector in the invention by a perspective view in a disassembly state.

As shown in FIG. 1, the optical connector of one embodiment has a receptacle connector 1 and a plug connector 2 fitted to this receptacle connector 1. A plug connector fitting portion 31 of a box shape with a front end as an opening 50 is formed in the receptacle connector 1. The plug connector 2 is fitted to this plug connector fitting portion 31.

Figure 5:
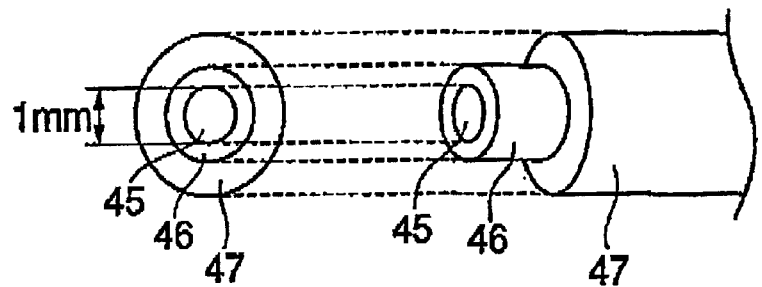
FIG. 5 is an explanatory view of a plastic optical fiber.

Connecting end face sides of a first multimode optical fiber 12 and a second multimode optical fiber 13 are fixedly arranged side by side in the plug connector 2. These multimode optical fibers 12, 13 are plastic optical fibers having 1 mm in diameter as shown in FIG. 5. The multimode optical fibers 12, 13 are step index optical fibers made cheaply and easily.

Figure 6:
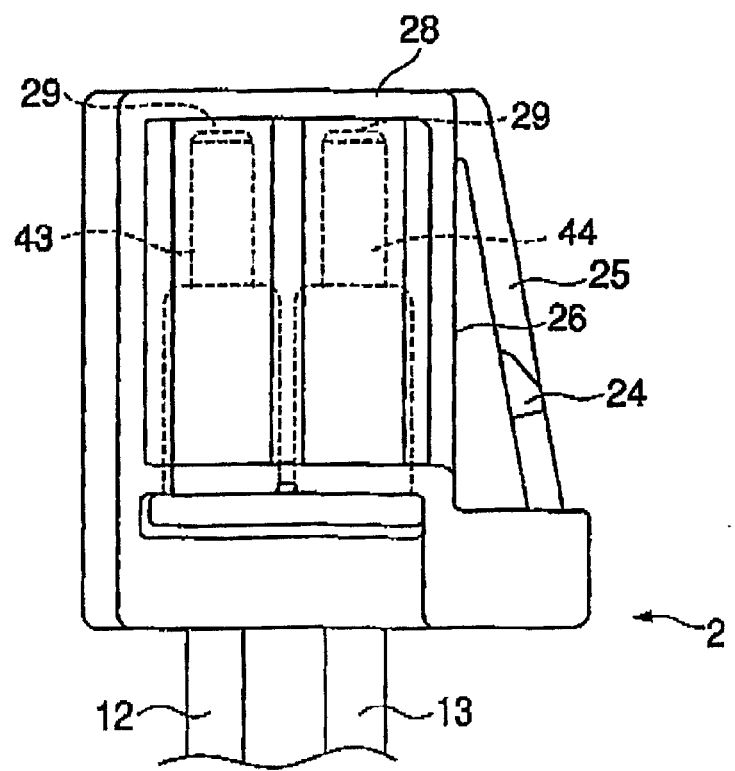
FIG. 6 is a plan explanatory view of a plug connector applied to the above embodiment.

The plastic optical fiber is generally formed by covering the outer circumferential side of an optical fiber element wire 45 with a primary coating 46, and further covering its outer circumference with a secondary coating 47. In one embodiment of the optical connector, the multimode optical fibers 12, 13 each constructed by the plastic optical fiber of such a construction are respectively inserted into ferrules 43, 44 shown in FIG. 6 and are fixed to the plug connector 2 in a removing state of the secondary coating 47 of each of the multimode optical fibers 12, 13. As shown in FIG. 6, a connecting end face 29 of each of the multimode optical fibers 12, 13 is arranged in a position deeper than a connecting end face 28 of the plug connector 2.

A lock arm 25 is extended and formed on a side face 26 of the plug connector 2 such that the lock arm 25 is directed to a side of the connecting end face 28 of the plug connector 2. A claw portion 24 is formed in an intermediate portion of the lock arm 25. When the plug connector 2 is inserted into the receptacle connector 1, the claw portion 24 is fitted to a claw fitting portion 23 formed in the plug connector fitting portion 31 of the receptacle connector 1 so that an extraction preventing state is set.

Figure 2A:
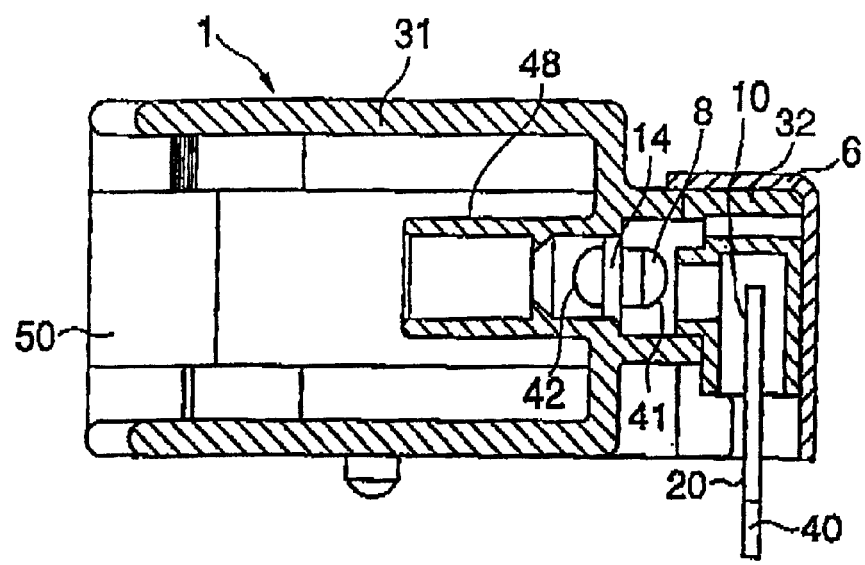
FIG. 2A is a sectional explanatory view showing a receptacle connector applied to the above embodiment.
Figure 2B:
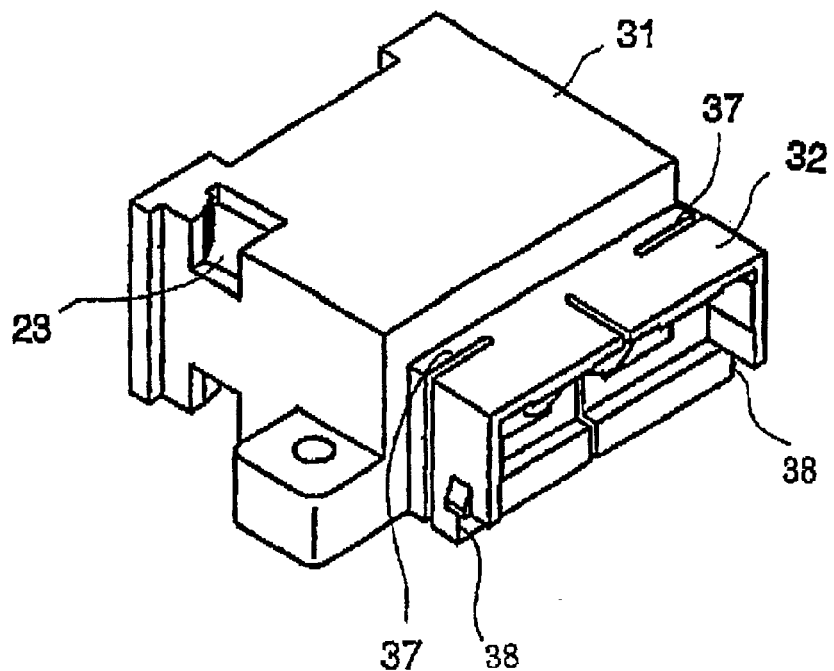
FIG. 2B is a perspective explanatory view showing the receptacle connector applied to the above embodiment.

The receptacle connector 1 is formed by PBT (polybutylene terephthalate) including a carbon filler as electroconductive resin. As shown in FIGS. 1, 2A and 2B, a storing portion 32 of an optical element is arranged in the receptacle connector 1. A light emitting element 10 having a radiation numerical aperture larger than the numerical aperture of the multimode optical fiber 12 is arranged in this storing portion 12. This light emitting element 10 and a light receiving element 11 are arranged side by side.

As shown in FIG. 2B, a notch 38 is formed on a side face of the storing portion 32. This notch 3B is formed to uppermost portions of terminals 20, 21 of the light emitting element 10 and the light receiving element 11 stored to the storing portion 32 so that no terminals 20, 21 come in contact with the storing portion 32.

Thus, in the construction having the notch 38, it is possible to restrain the terminals 20, 21 from coming in contact with the receptacle connector 1 by blowing-up of solder, deformation, etc. Further, in the construction forming the notch in the storing portion 32, disadvantages due to the contact of the terminals 20, 21 and the storing portion 32 constructed by electroconductive resin can be restrained.

Figure 7:
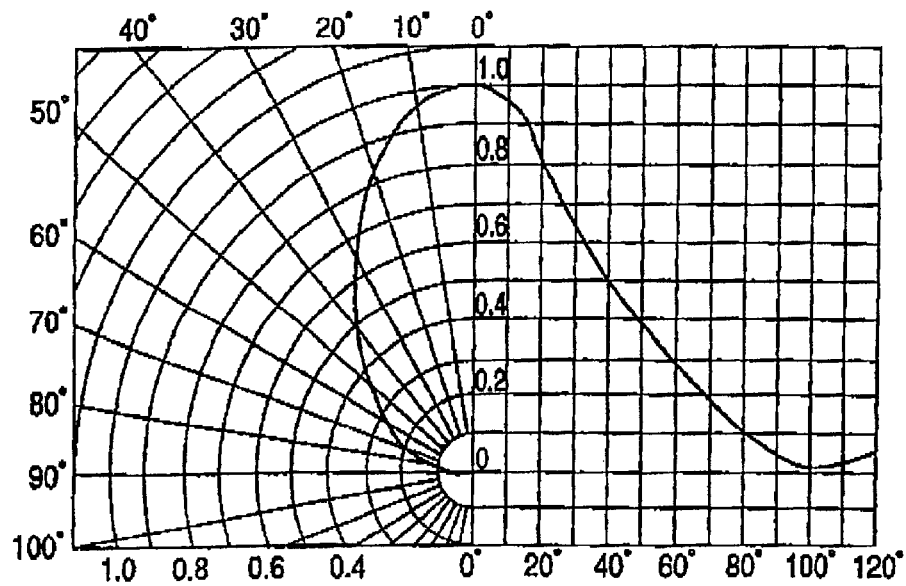
FIG. 7 is a graph showing a radiating pattern of a light emitting element applied to the above embodiment.

The light emitting element 10 is a light emitting diode (LED), and its radiation numerical aperture (NA=α) is 0.87. FIG. 7 shows a radiating pattern of this light emitting element 10.

Figure 3A:
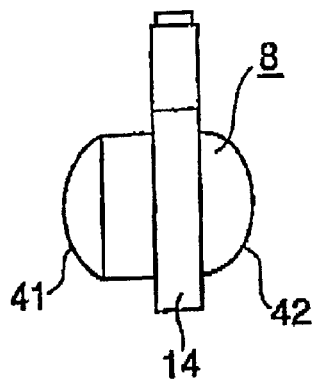
FIG. 3A is a side explanatory view of a convergent lens arranged in the optical connector of the above embodiment.
Figure 3B:
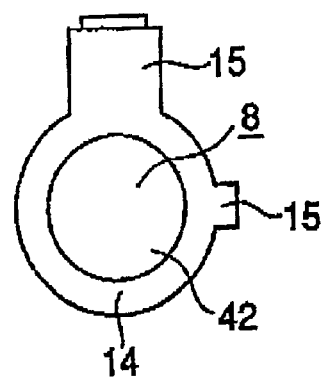
FIG. 3B is a front explanatory view of the convergent lens arranged in the optical connector of the above embodiment.

A convergent lens 8 is arranged in the receptacle connector 1. The convergent lens 8 converges light emitted from the light emitting element 10 so as to provide an incident numerical aperture (0.25) smaller than the numerical aperture (NA=β=0.5) of the multimode optical fiber 12, and makes this light incident to the multimode optical fiber 12. As shown in FIGS. 3A and 3B, the convergent lens 8 is a lens molded by transparent resin, and is fixed to a flange 14 for fixation. A fitting error preventing key 15 is arranged in the flange 14 for fixation so as to precisely arrange the convergent lens 8.

The convergent lens 8 has aspherical surfaces 41 and 42. As shown in FIG. 2A, with respect to the convergent lens 8, a side of the aspherical surface 41 is opposed to the light emitting element 10, and a side of the aspherical surface 42 is opposed to the side of a sleeve 48. This sleeve 48 guides the ferrule 43 of the plug connector 2, and axially aligns the multimode optical fiber 12 and the light emitting element 10.

An unillustrated sleeve arranged side by side with the sleeve 48 is arranged on a side of the light receiving element 11. The sleeve on this side of the light receiving element 11 has a function for guiding the ferrule 44 of the plug connector 2, and axially aligning the multimode optical fiber 13 and the light receiving element 11. An optical connection mediation fiber 9 is arranged between the light receiving element 11 and the sleeve on this side of the light receiving element 11 (on a light incident side of the light receiving element 11). The optical connection mediation fiber 9 is formed by a plastic optical fiber.

Further, a metal case 6 for fixing an optical element (the light emitting element 10 and the light receiving element 11) stored to the receptacle connector 1 is arranged. This metal case 6 is arranged in a mode covering the storing portion 32 of the receptacle connector 1, and a terminal portion 40 for ground is formed in the metal case 6.

For example, the metal case 6 is formed by bending processing of a metallic plate of brass. As shown in FIG. 1, plural projecting portions 16 are formed on the surface of a wall 39 of the metal case 6. As shown in this figure, the metal case 6 is attached to the receptacle connector 1 from an upper side of the receptacle connector 1, and the wall 39 is inserted into a groove 37 of the receptacle connector 1. Thus, the projecting portions 6 bites into the receptacle connector 1 so that the metal case 6 is electrically connected to the receptacle connector 1. Plating of tin, nickel, gold, solder, etc. is performed on the surface of the metal case 6 to mainly prevent corrosion.

Figure 4A:
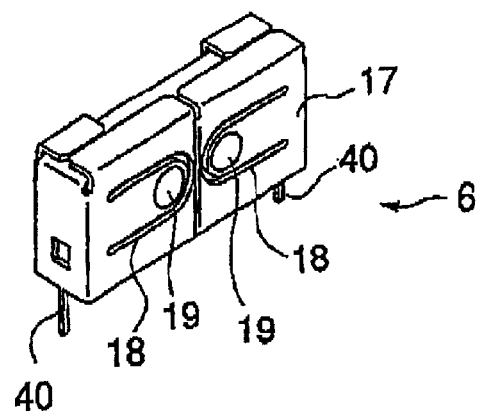
FIG. 4A is an explanatory view of a metal case arranged in the optical connector of the above embodiment.

As shown in FIG. 4A, a spring mechanism for biasing each of the light emitting element 10 and the light receiving element 11 on a side of the plug connector fitting portion 31 is arranged on a face 17 of the metal case 6 on its optical element fixing side. In this spring mechanism, a slit 18 transversally having a U-shape is formed on the face 17 of the optical element fixing side, and a convex portion 19 projected onto a face side abutting on the light emitting element 10 and the light receiving element 11 is formed.

The spring mechanism has a function for absorbing the difference in size error between the light emitting element 10, the light receiving element 11 and the storing portion 32 of the receptacle connector 1 by the above biasing force, and precisely fixing the light emitting element 10 and the light receiving element 11 to the storing portion 32.

One embodiment of the optical connector is constructed as mentioned above. In one embodiment, as shown in FIG. 1, the plug connector 2 is inserted and fitted into the plug connector fitting portion 31 of the receptacle connector 1. Thus, the claw portion 24 of the plug connector 2 is fitted to the claw fitting portion 23 of the receptacle connector 1 so that an extraction preventing state is set. The multimode optical fibers 12 and 13 fixed to the plug connector 2 are respectively optically connected to the light emitting element 10 and the light receiving element 11 stored to the receptacle connector 1.

In this optical connection, since the convergent lens 8 is arranged on an emitting side of the light emitting element 10 in the receptacle connector 1, the convergent lens 8 plays the following role. Namely, the convergent lens 8 converges light emitted from the light emitting element 10 so as to provide an incident numerical aperture smaller than the numerical aperture of the multimode optical fiber 12, and makes this light incident to the multimode optical fiber 12.

A refraction angle becomes appropriate by the above function of the convergent lens 8 when light is propagated within the multimode optical fiber 12 while this light is refracted. Therefore, no bending loss is increased even when bending of the multimode optical fiber 12 is caused. Further, when the multimode optical fiber 12 is connected to another optical fiber, no large transmission loss is caused even when positions of the optical fibers are more or less shifted from each other. This was clarified by an experiment by the present inventors.

Figure 8:
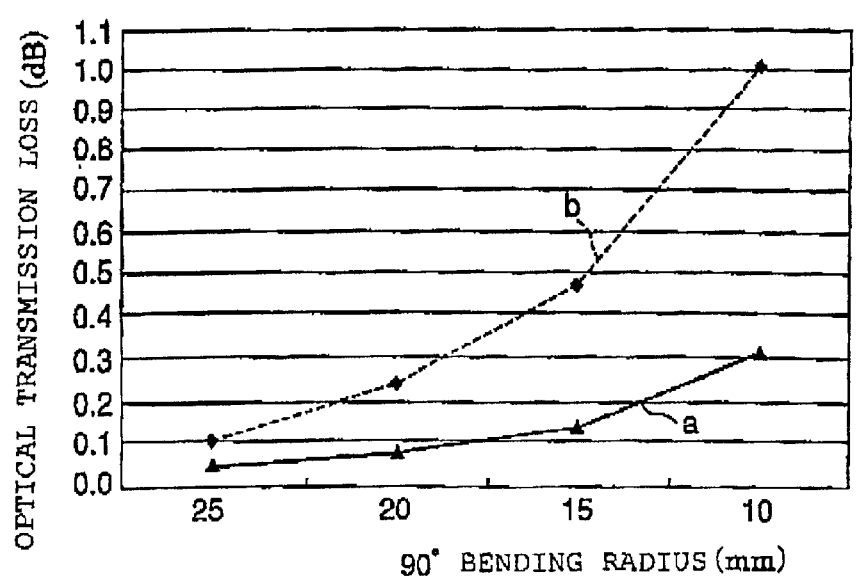
FIG. 8 is a graph showing transmission loss of the optical connector of the above embodiment due to bending together with transmission loss due to bending in an optical connector formed without arranging a lens.

A characteristic line a of FIG. 8 shows measuring results of the optical transmission loss due to the bending when the multimode optical fiber 12 is set to 5 m in length and is actually bent 90° in one embodiment. A bending radius of the above 90° bending is set to 10 mm, 15 mm, 20 mm and 25 mm. A characteristic line b of this figure shows the optical transmission loss when a conventional optical connector having no convergent lens 8 is similarly bent.

As shown by the characteristic line a of FIG. 8, the optical transmission loss in one embodiment is very small by arranging the convergent lens 8 in comparison with the results of the characteristic line b of this figure in which no convergent lens 8 is arranged. In particular, when the bending radius is 10 mm, the optical transmission loss can be reduced by 0.7 dB in comparison with the optical connector using no convergent lens 8.

Further, the present inventors measured coupling loss (transmission loss due to connection) as follows when the multimode optical fiber 12 is connected to an optical fiber (plastic optical fiber) on a connecting partner side. As a result, it has been confirmed that the coupling loss can be reduced by using the optical connector of one embodiment in any case.

Figure 9:
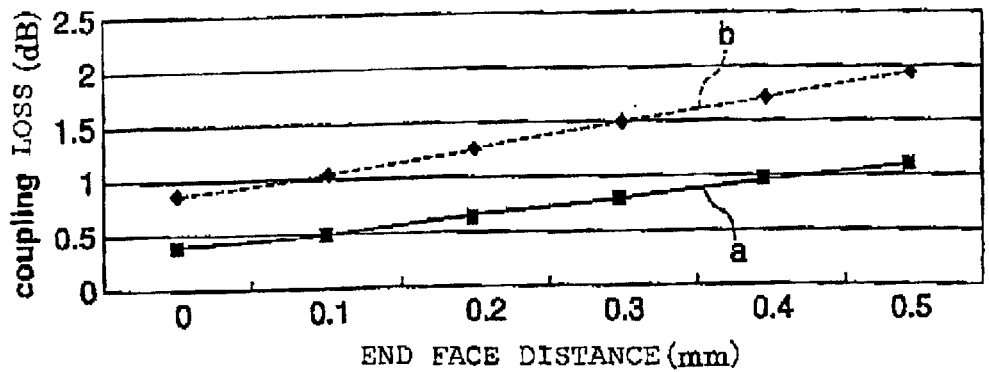
FIG. 9 is a graph showing a difference in coupling loss due to the difference in end face distance between the optical fiber of the optical connector of the above embodiment and an optical fiber on a connecting partner side in comparison with a case in which no lens is arranged.

For example, the multimode optical fiber 12 arranged in the optical connector of one embodiment and the optical fiber on the connecting partner side are arranged so as not to be axially shifted from each other. In this state, the distance between end faces of the optical fibers is increased until 0.5 mm by every 0.1 mm. When the coupling loss at this time is measured, results shown by a characteristic line a of FIG. 9 are obtained. A characteristic line b of this figure shows results similarly considered with respect to the multimode optical fiber 12 of the optical connector having no convergent lens 8.

Figure 10:
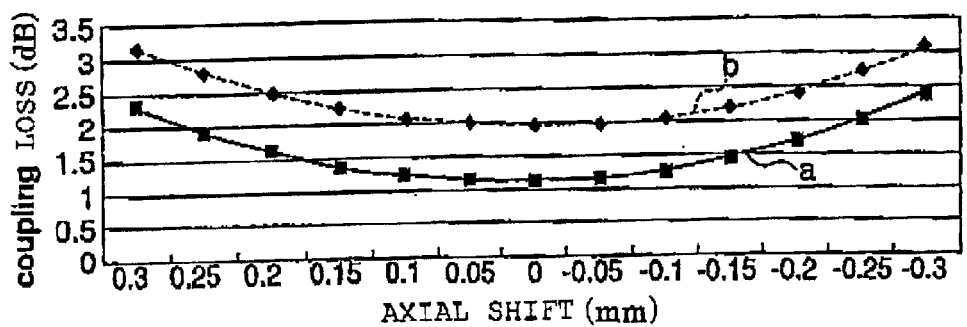
FIG. 10 is a graph showing the difference in coupling loss due to an axial shift amount between the optical fiber of the optical connector of the above embodiment and the optical fiber on the connecting partner side in comparison with the case in which no lens is arranged.

The transmission loss is also measured when the end face distance between the multimode optical fiber 12 arranged in the optical connector of one embodiment and the optical fiber on the connecting partner side is set to 0.5 mm, and the axial shift between the optical fibers is changed from 0.05 mm to 0.3 mm. Results of this measurement are shown by a characteristic line a of FIG. 10. A characteristic line b of this figure shows results similarly considered with respect to the multimode optical fiber 12 of the optical connector having no convergent lens 8. The axial shift is shown by a coordinate position in which nonexistence of the axial shift is set to a reference (0).

When the optical connector is applied to optical communication for a vehicle, it is required that the coupling loss of the optical fibers is set to not more than 2 dB. As can be seen from FIG. 10, in the conventional example in which no convergent lens 8 is arranged, it is necessary to set the axial shift of the optical fibers to lie within +0.05 mm to satisfy this requirement. Accordingly, it is difficult to realize this requirement.

In contrast to this, if the optical connector of one embodiment is applied, it is sufficient to set the axial shift of the optical fibers to lie within about ±0.25 mm to satisfy the above requirement. Namely, it has been confirmed that no large transmission loss is caused and it is suitable for the optical communication for a vehicle by applying the optical connector of one embodiment even when the axial shift of the optical fibers is caused more or less.

Figure 11:
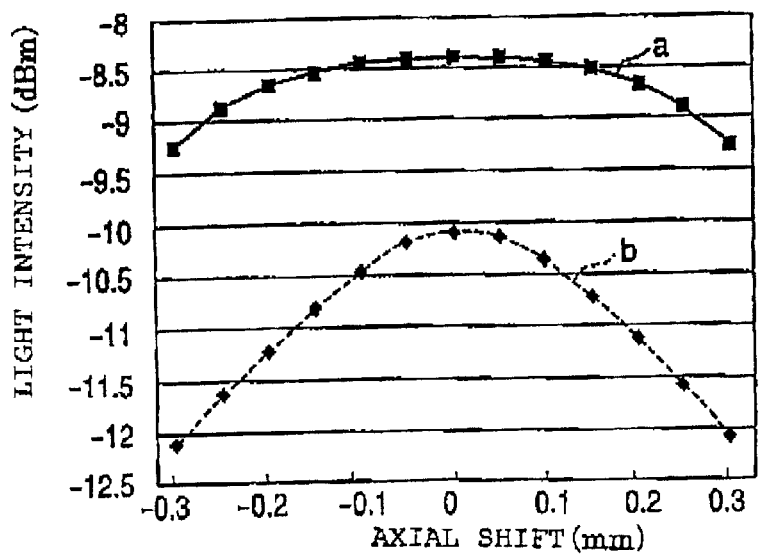
FIG. 11 is a graph showing the difference in transmission light intensity due to the axial shift amount between the optical fiber of the optical connector of the above embodiment and a light emitting element in comparison with the transmission light intensity in an optical connector formed by arranging a short optical fiber between the light emitting element and the optical fiber.

A characteristic line a of FIG. 11 shows the relation of an axial shift amount and transmission light intensity when the multimode optical fiber 12 and the light emitting element 10 are axially shifted on purpose in the optical connector of one embodiment. Similar to FIG. 10, the axial shift amount is shown by a coordinate position in FIG. 11.

A characteristic line b of FIG. 11 shows results similarly considered when a short optical fiber 30 is interposed between the light emitting element 10 and the multimode optical fiber 12 as a comparison example of the one embodiment. Each of transmission light intensities shown by these characteristic lines a, b shows a measuring value of output light from the multimode optical fiber 12 having 5 m in length.

As can be seen from the characteristic line b of FIG. 11, even when the light emitting element 10 and the multimode optical fiber 12 are connected to each other through the short optical fiber 30, the optical transmission loss is large when the multimode optical fiber 12 and the short optical fiber 30 are connected in an axial shifting state.

In contrast to this, as shown by the characteristic line a of FIG. 11, no large transmission loss is caused by applying the optical connector of one embodiment (i.e., arranging the convergent lens 8 between the light emitting element 10 and the multimode optical fiber 12) even when the axial shift of the multimode optical fiber 12 and the convergent lens 8 is caused more or less. It has been confirmed by the above consideration that the optical connector of one embodiment is suitable for the optical communication for a vehicle.

Further, the one embodiment is simply constructed such that the plug connector 2 fixedly inserting the multimode optical fibers 12, 13 thereinto is fitted to the receptacle connector 1 having a simple construction in which the convergent lens 8 is arranged on an emitting side of the light emitting element 10. Therefore, the one embodiment can realize a cheap optical connector.

Further, in the optical connector of one embodiment, the spring mechanism for biasing each of the light emitting element 10 and the light receiving element 11 on a side of the plug connector fitting portion 31 is arranged on the face 17 of the metal case 6 on its optical element fixing side arranged on a side of the receptacle connector 1. The spring mechanism can absorb errors in sizes of the light emitting element 10, the light receiving element 11 and the storing portion 32 of the receptacle connector 1. Accordingly, the optical connector of one embodiment can precisely fix the light emitting element 10 and the light receiving element 11 to the storing portion 32.

Accordingly, in the optical connector of one embodiment, it is not necessary to set the sizes of the light emitting element 10, the light receiving element 11 and the receptacle connector 1 with very high precision so that the optical connector can be further cheaply manufactured.

Further, as shown in FIG. 4A, in the spring mechanism, the slit 18 of a U-shape is formed on the face 17 of the optical element fixing side of the metal case 6, and the convex portion 19 projected on a face side abutting on the light emitting element 10 and the light receiving element 11 is formed. Namely, no elastic body such as, a coil spring is arranged separately from the metal case 6 in the spring mechanism. Therefore, in one embodiment, the number of parts is not increased by arranging the spring mechanism, and the light emitting element 10 and the light receiving element 11 can be very easily fixed.

The spring mechanism desirably presses the extension of a line connecting the convergent lens 8, the optical connection mediation optical fiber 9 and the optical element (the light emitting element 10 and the light receiving element 11). Therefore, in one embodiment, as shown in FIG. 4A, the slit 18 is formed such that a longitudinal direction of the slit 18 is a transversal direction (horizontal direction), and the extension is pressed by the spring mechanism in an appropriate position.

Figure 4B:
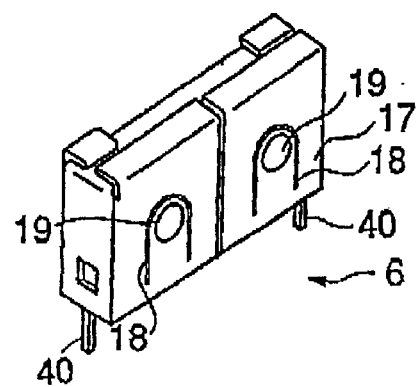
FIG. 4B is an explanatory view showing an example of the metal case arranged in another embodiment of the optical connector of the invention.

When the slit 18 is formed such that the longitudinal direction of the slit 18 is the transversal direction, the length of the slit 18 in its longitudinal direction can be lengthened in comparison with a case in which the slit 18 is formed such that the longitudinal direction of the slit 18 is a lengthwise direction as shown in FIG. 4B. Accordingly, a moderate spring pressure can be obtained.

Further, in one embodiment, each of the multimode optical fibers 12, 13 is arranged in a position deeper than the connecting end face of the plug connector 2. Accordingly, the optical connector of one embodiment can prevent the connecting end faces of the multimode optical fibers 12, 13 from being damaged at a treating time of the plug connector 2. Namely, in the one embodiment, it is possible to improve yield of the optical connector in which the plug connector 2 is fitted to the receptacle connector 1.

Further, in the one embodiment, the optical connector is constructed by arranging the light emitting element 10 and the light receiving element 11 side by side. Therefore, in the optical connector of one embodiment, the light emitting element 10 and the light receiving element 11 corresponding to the multimode optical fibers 12, 13 can be optically collectively connected by fitting the plug connector 2 to the receptacle connector 1. Accordingly, it is possible to realize both a reduction in the number of connector parts and the improvement of a connector connecting work property.

Further, in the one embodiment, the optical mediation connecting fiber 9 is arranged on an incident side of the light receiving element 11. In this connection, coupling loss of the light receiving element 11 and the multimode optical fiber 13 can be reduced in comparison with a case in which the light receiving element 11 and the multimode optical fiber 13 are connected in a large separating state.

The invention is not limited to the above embodiment, but various embodiment modes can be adopted. For example, in the one embodiment, the optical mediation connecting fiber 9 is arranged on the incident side of the light receiving element 11, but a lens may be arranged instead of the optical mediation connecting fiber 9.

Further, in the one embodiment, as shown in FIG. 4A, the slit 18 transversally having a U-shape is arranged on the face 17 of the optical element fixing side as the spring mechanism of the metal case 6. However, as shown in FIG. 4B, the slit 18 may also transversally have the U-shape.

Further, the slit may be also formed in a shape except for the U-shape. For example, the slit may be formed in a shape of a square with one side missing or C shape. Further, at least one portion of the face 17 of the optical element fixing side may be also inclined on a side of the optical element such as the light emitting element 10 and the light receiving element 11 as well as the formation of the slit.

Further, in the one embodiment, the plural projecting portions 16 are arranged in the metal case 6. However, the number of arranged projecting portions 16 and a forming mode of the projecting portions 16 are not particularly limited, but are suitably set. Furthermore, the projecting portions 16 can be also omitted. However, the receptacle connector 1 can be reliably electrically conducted by one action by arranging the projecting portions 16 when the metal case 6 is attached to the receptacle connector 1.

Further, in the one embodiment, the metal case 6 is formed by brass, but may be also formed by e.g., stainless steel.

Further, in the one embodiment, the light emitting element 10 and the light receiving element 11 are arranged side by side and stored as one set. However, only the light emitting element 10 may be also stored to the optical connector of the invention. Further, each of the number of arranged light emitting elements 10 and the number of arranged light receiving elements 11 may be also set to one and plural.

Further, in the explanation of the above example, the optical connector of the invention is used in the optical communication within a vehicle, but can be also applied to various uses of the optical communication such as FA, LAN within a home, audio and PC.

In the above example, the optical fiber inserted into the optical connector is set to the plastic optical fiber having 1 mm in diameter, but may be also set to the plastic optical fiber having e.g., 0.75 mm in diameter and the plastic optical fiber having e.g., 0.5 mm in diameter. The above effects of the optical connector of the invention can be effectively shown by setting the diameter of the plastic optical fiber to e.g., 0.5 mm.

Further, a glass optical fiber may be also used as the optical fiber inserted into the optical connector of the invention, and no kind of the optical fiber is limited.

What is claimed is:

1. An optical connector comprising:

a receptacle connector; and a plug connector fitted to the receptacle connector;

wherein a connecting end face side of a multimode optical fiber is fixed to the plug connector; and a light emitting element having a radiation numerical aperture larger than the numerical aperture of said multimode optical fiber, and a convergent lens for converging light emitted from the light emitting element so as to provide an incident numerical aperture of about 0.25 or more but smaller than the numerical aperture of said multimode optical fiber and making this light incident to said multimode optical fiber are arranged in said receptacle connector.

2. An optical connector according to claim 1, wherein the light emitting element is set to a light emitting diode (LED).

3. An optical connector according to claim 1, wherein the multimode optical fiber is set to a plastic optical fiber having a diameter not less than 0.5 mm.

4. An optical connector according to claim 1, wherein the connecting end face of the multimode optical fiber is arranged in a position deeper than a connecting end face of the plug connector.

5. An optical connector comprising:

a receptacle connector; and a plug connector fitted to the receptacle connector;

wherein a connecting end face side of a multimode optical fiber is fixed to the plug connector; and a light emitting element having a radiation numerical aperture larger than the numerical aperture of said multimode optical fiber, and a convergent lens for convergent light emitted from the light emitting element so as to provide an incident numerical aperture smaller than the numerical aperture of said multimode optical fiber and making this light incident to said multimode optical fiber are arranged in said receptacle connector;

wherein a light receiving element arranged side by side with the light emitting element is arranged in the receptacle connector;

a first multimode optical fiber optically connected to said light emitting element, and a second multimode optical fiber optically connected to said light receiving element are arranged side by side in the plug connector; and an optical connection mediation optical fiber is arranged on a light incident side of said light receiving element in said receptacle connector.

* * * * *

UNITED STATES PATENT AND TRADEMARK OFFICE
CERTIFICATE OF CORRECTION

PATENT NO.     : 6,793,412 B2
DATED          : September 21, 2004
INVENTOR(S)    : Nishita It is certified that error appears in the above-identified patent and that said Letters Patent is hereby corrected as shown below:

Column 10,
Line 22, please delete "convergent" and insert therefore, -- converging --.

Signed and Sealed this

Twenty-ninth Day of November, 2005

JON W. DUDAS
*Director of the United States Patent and Trademark Office*